United States Patent
Honda et al.

(10) Patent No.: US 11,515,590 B2
(45) Date of Patent: Nov. 29, 2022

(54) PARTITION MEMBER AND ASSEMBLED BATTERY

(71) Applicant: Mitsubishi Chemical Corporation, Chiyoda-ku (JP)

(72) Inventors: Tatsuhiko Honda, Chiyoda-ku (JP); Naoto Maru, Chiyoda-ku (JP); Tomohiro Kawai, Chiyoda-ku (JP); Iwao Soga, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 103 days.

(21) Appl. No.: 16/885,491

(22) Filed: May 28, 2020

(65) Prior Publication Data

US 2020/0295415 A1    Sep. 17, 2020

Related U.S. Application Data

(63) Continuation of application No. PCT/JP2018/044273, filed on Nov. 30, 2018.

(30) Foreign Application Priority Data

Nov. 30, 2017   (JP) .............................. JP2017-231280

(51) Int. Cl.
*H01M 10/6555* (2014.01)
*H01M 10/613* (2014.01)
*H01M 10/625* (2014.01)
*H01M 10/647* (2014.01)
*H01M 10/653* (2014.01)
(Continued)

(52) U.S. Cl.
CPC ..... *H01M 10/6555* (2015.04); *H01M 10/613* (2015.04); *H01M 10/625* (2015.04);
(Continued)

(58) Field of Classification Search
CPC ............. H01M 10/613; H01M 10/625; H01M 10/647; H01M 10/653; H01M 10/6555;
(Continued)

(56) References Cited

U.S. PATENT DOCUMENTS

2012/0148895 A1   6/2012   Fujikawa et al.
2018/0351221 A1   12/2018  Kuboki et al.
(Continued)

FOREIGN PATENT DOCUMENTS

CN      202616368 U      12/2012
EP      3 598 566 A1     1/2020
(Continued)

OTHER PUBLICATIONS

Extended European Search Report dated Nov. 23, 2020 in European Patent Application No. 18883758.7, 9 pages.
(Continued)

*Primary Examiner* — Lingwen R Zeng
(74) *Attorney, Agent, or Firm* — Oblon, McClelland, Maier & Neustadt, L.L.P.

(57) ABSTRACT

A partition member includes an encapsulated body capable of retaining a liquid, and an outer package body for accommodating the encapsulated body and the liquid. The area S1 of the encapsulated body when the outer package body and the encapsulated body are seen in a planar view from the thickness direction and the area S2 of a gap between the outer package body and the encapsulated body satisfy the relationship represented by formula 1 below, and the volume V1 of the liquid and the volume V2 of the encapsulated body satisfy the relationship represented by formula 2 below.

$S1/(S1+S2) \leq 0.99$ and    Formula 1

$0.02 \leq V1/V2 \leq 1.90$    Formula 2

13 Claims, 7 Drawing Sheets

(51) Int. Cl.
   *H01M 10/6567*   (2014.01)
   *H01M 50/20*     (2021.01)
   *H01M 10/658*    (2014.01)
   *H01M 50/204*    (2021.01)

(52) U.S. Cl.
   CPC ....... *H01M 10/647* (2015.04); *H01M 10/653* (2015.04); *H01M 10/6567* (2015.04); *H01M 50/20* (2021.01); *H01M 10/658* (2015.04); *H01M 50/204* (2021.01); *Y02E 60/10* (2013.01)

(58) Field of Classification Search
   CPC ........... H01M 10/6567; H01M 10/658; H01M 50/20; H01M 50/204; H01M 50/293; Y02E 60/10
   See application file for complete search history.

(56) References Cited

U.S. PATENT DOCUMENTS

| | | | |
|---|---|---|---|
| 2019/0165436 A1* | 5/2019 | Kuboki | H01M 10/659 |
| 2020/0058972 A1 | 2/2020 | Kawai et al. | |
| 2020/0251790 A1 | 8/2020 | Kuboki et al. | |

FOREIGN PATENT DOCUMENTS

| | | | |
|---|---|---|---|
| JP | 2005-147637 | A | 6/2005 |
| JP | 2012-048905 | A | 3/2012 |
| JP | 2013-131428 | A | 7/2013 |
| JP | 5352681 | B2 | 11/2013 |
| KR | 10-0392340 | B1 | 7/2003 |
| WO | WO 2012/032697 | A | 3/2012 |
| WO | WO 2017/094819 | A1 | 6/2017 |
| WO | WO 2017/094821 | A1 | 6/2017 |

OTHER PUBLICATIONS

International Preliminary Report on Patentability and Written Opinion dated Jun. 2, 2020 in PCT/JP2018/044273 (English Translation only), 6 pages.

International Search Report dated Feb. 19, 2019 in PCT/JP2018/044273 filed on Nov. 30, 2018, 1 page.

Office Action dated Apr. 29, 2022, in corresponding Indian Patent Application No. 202047026993 (with English Translation), 6 pages.

* cited by examiner

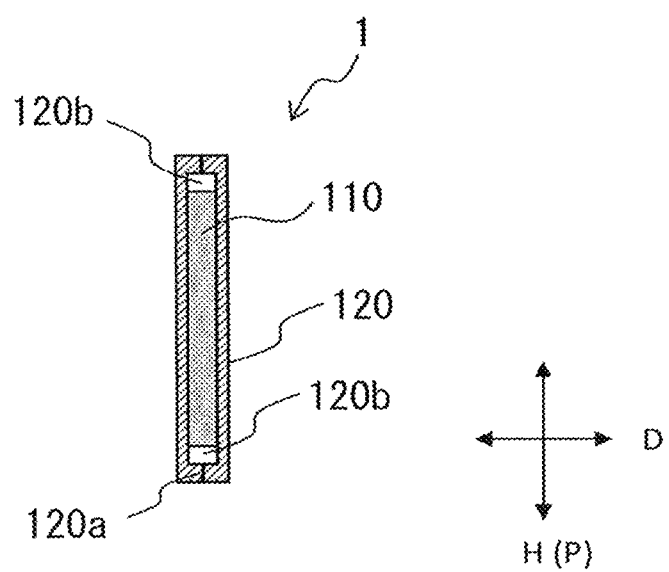

PARTITION MEMBER AND ASSEMBLED BATTERY

CROSS-REFERENCE TO RELATED APPLICATION

This application is a continuation application of International Application PCT/JP2018/044273 filed on Nov. 30, 2018 and designated the U.S., and this application is based upon and claims the benefit of priority of the prior Japanese Patent Application No. 2017-231280, filed on Nov. 30, 2017, the entire contents of which are incorporated herein by reference.

BACKGROUND

1. Field

The disclosure relates to a partition member and an assembled battery.

2. Description of the Related Art

The use of secondary batteries as power sources for vehicles and the like has grown dramatically in recent years. Studies are being conducted on further increasing the energy density of secondary batteries, for the purpose of, for instance, increasing the degree of freedom in mounting of a secondary battery in the limited space of a vehicle or the like, and extending the cruising range that may be covered with one charging. On the other hand, a tradeoff tends to arise in secondary batteries between safety and energy density, in that the higher the energy density of the secondary battery, the lower the safety of the battery tends to be. For instance, in secondary batteries mounted on electric vehicles with a cruising range of several hundred km, the surface temperature of the battery in the case of damage to the battery, for instance, due to overcharge or internal short-circuits, may exceed several hundred degrees C., and may reach about 1000° C.

Since a secondary battery used as a power supply of a vehicle or the like is generally used as an assembled battery made up of a plurality of unit batteries (hereinafter, also referred to as "cells"), when one of the unit batteries constituting the assembled battery is damaged and reaches the temperature range described above, there is a risk that the heat generation may damage adjacent unit batteries and the damage may spread in a chain reaction across the entire assembled battery. In order to prevent such a chain of damage among unit batteries, various techniques are being proposed, including providing a partition member between one unit battery and another to quickly move heat from a unit battery at which abnormal heat generation had occurred to a nearby unit battery and to cool a damaged unit battery.

For example, there exists a module in which a partition member, which is configured so that a coolant such as water is contained in a sheet-like bag, is disposed between single batteries (for example, see PTL 1). According to this module, it is possible to efficiently move heat generated by a single battery to an adjacent single battery and, in cases where an adjacent battery is damaged and the temperature of the surface of the battery increases, the damaged battery may be cooled by water stored in the bag being released from an easy-to-open portion. In addition, there exists a partition member that is configured so that a porous body impregnated with a coolant such as water is contained in a sheet-like bag (for example, see PTL 2).

[PTL 1] Japanese Patent No. 5352681
[PTL 2] Japanese Patent Application Publication No. 2013-131428

SUMMARY

As a result of detailed research on these products of the background art, the inventors of the present invention have found the following problems. That is, single batteries in an assembled battery are subjected to a constraining force when the assembled battery is produced. In addition, because electrodes in single batteries expand when charged, the battery housing also expands and adjacent members are compressed. Furthermore, as a result of repeated use of single batteries, pressure is exerted as a result of expansion caused by gas being generated from an electrolyte solution in a single battery. For these reasons, a partition member disposed between single batteries needs to be pressure-resistant. However, sufficient consideration has not been given to pressure resistance in the partition members disclosed in PTL 1 and 2.

In view of the problems mentioned above, the problem to be addressed by an embodiment of the present invention is to provide a partition member and an assembled battery having ideal pressure resistance and heat conduction characteristics.

As a result of diligent research carried out in order to solve the problems mentioned above, the inventors of the present invention found that the problems mentioned above could be solved by a partition member which includes an encapsulated body capable of retaining a liquid and an outer package body for accommodating the encapsulated body and the liquid, and in which appropriate relationships are established between the sizes of the outer package body and the encapsulated body and between the volumes of the encapsulated body and the liquid, and thereby completed the present invention. That is, the gist of an embodiment of the present invention is as follows.

[1] A partition member which has a thickness direction and a planar direction orthogonal to the thickness direction and which constitutes a partition between single batteries that constitute an assembled battery in the thickness direction or between a single battery that constitutes an assembled battery and a member other than the single battery, wherein the partition member includes
an encapsulated body capable of retaining a liquid, and
an outer package body for accommodating the encapsulated body and the liquid;
the area S1 of the encapsulated body when the outer package body and the encapsulated body are seen in a planar view from the thickness direction and the area S2 of a gap between the outer package body and the encapsulated body satisfy the relationship represented by formula 1 below; and
the volume V1 of the liquid and the volume V2 of the encapsulated body satisfy the relationship represented by formula 2 below.

$$S1/(S1+S2) \leq 0.99 \qquad \text{Formula 1:}$$

$$0.02 \leq V1/V2 \leq 1.90 \qquad \text{Formula 2:}$$

[2] The partition member according to [1], wherein S1 and S2 above satisfy the relationship represented by formula 3 below.

$$0.10 \leq S1/(S1+S2) \leq 0.99 \qquad \text{Formula 3:}$$

[3] The partition member according to [1] or [2], wherein the liquid retained in the encapsulated body moves to the gap between the outer package body and the encapsulated body as a result of deformation of the outer package body and the encapsulated body when the external pressure increases.

[4] The partition member according to [3], wherein the liquid that has moved to the gap between the outer package body and the encapsulated body moves to the inner part of the encapsulated body as a result of deformation of the outer package body and the encapsulated body when the external pressure decreases.

[5] The partition member according to any one of [1] to [4], wherein the encapsulated body is fixed in an internal space in the outer package body.

[6] The partition member according to any one of [1] to [5], wherein the air pressure in the internal space in the outer package body is lower than the air pressure outside the outer package body.

[7] The partition member according to any one of [1] to [6], wherein the encapsulated body is formed of a material that includes a porous body.

[8] The partition member according to [7], wherein the porous body contains a fibrous substance and/or particles.

[9] The partition member according to any one of [1] to [8], wherein the outer package body is a laminated body of a metal foil and a resin.

[10] The partition member according to [9], wherein the metal foil is at least one type selected from an aluminum foil, a copper foil, a tin foil, a nickel foil, a stainless steel foil, a lead foil, a tin-lead alloy foil, a bronze foil, a silver foil, an iridium foil and phosphor bronze.

[11] The partition member according to [9] or [10], wherein the resin is a thermoplastic resin.

[12] An assembled battery that is provided with the partition member according to any one of [1] to [11].

According to an embodiment of the present invention, it is provided that a partition member and an assembled battery having ideal pressure resistance and heat conduction characteristics.

BRIEF DESCRIPTION OF THE DRAWINGS

FIG. 1B is a view illustrating an end surface of the partition member illustrated in FIG. 1A, in a case where the partition member is cut along the line denoted by A-A;

DESCRIPTION OF THE PREFERRED EMBODIMENT

Figure 1A:
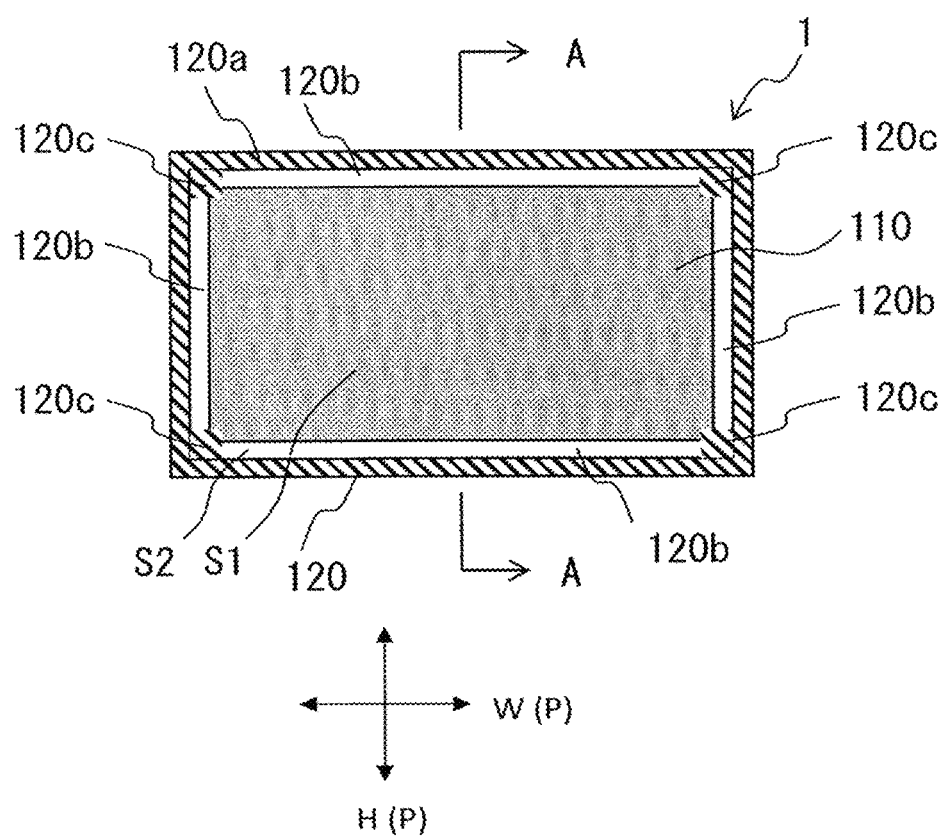
FIG. 1A is a front view that illustrates a first example of a configuration of a partition member according to an embodiment.

The present invention will now be explained in detail. The explanation given below is one example (a representative example) of an embodiment of the present invention, and the present invention is not limited to these details as long as the gist of the present invention is not exceeded.

The partition member according to the present invention has a thickness direction and a planar direction orthogonal to the thickness direction and forms a partition between single batteries that constitute an assembled battery in the thickness direction or between a single battery that constitutes an assembled battery and a member other than the single battery, wherein the partition member includes an encapsulated body that capable of retaining a liquid and an outer package body for accommodating the encapsulated body and the liquid; the area S1 of the encapsulated body when the outer package body and the encapsulated body are seen in a planar view from the thickness direction and the area S2 of a gap between the outer package body and the encapsulated body satisfy the relationship represented by formula 1 below; and the volume V1 of the liquid and the volume V2 of the encapsulated body satisfy the relationship represented by formula 2 below. In addition, the assembled battery of the present invention is provided with the partition member of the present invention.

$$S1/(S1+S2) \leq 0.99 \qquad \text{Formula 1:}$$

$$0.02 \leq V1/V2 \leq 1.90 \qquad \text{Formula 2:}$$

A gap is formed between the encapsulated body and a portion where the edge part is sealed in the internal space that is formed so that the encapsulated body and the liquid are accommodated by the outer package body. That is, in cases where the outer package body and the encapsulated body are seen in a planar view from the thickness direction, the following relationship holds true.

[Area of gap(S2)]=[area of internal space]−[area(S1) of encapsulated body]=[[area of outer package body]−[area of edge part of outer package body]]−[area(S1) of encapsulated body]

Here, PTL 2 discloses a partition member that is configured so that a porous body impregnated with a coolant such as water is contained in a sheet-like bag, as mentioned above. In this partition member, a large amount of a liquid such as water is used as a coolant, that is to say, the value of V1/V2 is high, and it was therefore understood that pressure resistance is insufficient. Conversely, the partition member of the present invention exhibits improved pressure resistance by being designed so as to satisfy not only formula 1, but also formula 2.

Members other than single batteries in an assembled battery are, for example, a housing which has a bottom surface and four side surfaces and which accommodates single batteries and partition members that constitute the assembled battery. The gap is a portion formed between the encapsulated body and the sealed portion in the internal space, and is a portion where the outer package body and the encapsulated body are not in contact with each other, that is to say, a portion where the outer package body is not overlapped in a planar view. The gap serves as an evacuation space for the liquid retained in the encapsulated body. The portion where the edge part is sealed includes a welded or bonded portion and a folded portion in cases where the outer package body is folded in two.

In the partition member according to the present invention, the outer package body is deformed by external pressure exerted on the partition member. External pressure exerted on the partition member is, for example, a constraining force in an assembled battery production process, pressure exerted by a single battery as a result of expansion caused by charging of a single battery partitioned by the partition member, pressure exerted by a single battery as a result of expansion of a battery caused by gas generated from an electrolyte solution in the battery as a result of repeated use of the battery, and the like. For example, the outer package body contracts in the thickness direction as a result of a constraining force or expansion of an adjacent single battery. The encapsulated body accommodated in the internal space of the outer package body is deformed and compressed as a result of deformation of the outer package body. If the encapsulated body is compressed, the liquid retained in the encapsulated body exudes from the encapsulated body and is retained in the gap. Therefore, the liquid retained in the encapsulated body moves in the planar direction and the encapsulated body contracts, meaning that the external pressure exerted on the partition member is absorbed. In addition, because the sealed state of the outer package body is maintained, it is possible to avoid loss or reduction of the liquid, which acts as a heat transfer medium, due to the sealed state being released.

In addition, if the outer package body and the encapsulated body are seen in a planar view, the area S1 is the area of the internal space where the encapsulated body and the outer package body overlap (a region where the encapsulated body is present). In addition, if the outer package body and the encapsulated body are seen in a planar view, the area S2 may be taken to be the area of the internal space where the encapsulated body and the outer package body do not overlap (a region where the encapsulated body is not present).

In addition, the liquid retained in the encapsulated body may move to the gap as a result of deformation of the outer package body and the encapsulated body when the external pressure increases. In this type of partition member, liquid that has exuded from the encapsulated body is retained in the gap, and pressure exerted by a single battery or a member other than a single battery as a result of a constraining force or expansion of a single battery is absorbed.

In addition, the liquid that has moved to the gap inside the outer package body may move to the inner portion of the encapsulated body as a result of deformation of the outer package body and encapsulated body when the external pressure decreases. In this type of partition member, if the external pressure exerted on the partition member decreases and the pressure on the encapsulated body is released, the shape of the previously deformed outer package body returns to its original state. In addition, because the previously contracted encapsulated body returns to its original state, liquid that has exuded into the gap inside the outer package body is absorbed. Therefore, when the external pressure decreases, the partition member can return to its original state.

In addition, the area S1 and the area S2 preferably satisfy the relationship represented by formula 3 below.

$$0.10 \leq S1/(S1+S2) \leq 0.99 \quad \text{Formula 3:}$$

In addition, the encapsulated body may be fixed in the internal space. By configuring in this way, in cases where pressure is exerted by a single battery or a member other than a single battery, because the encapsulated body is fixed and does not move in the internal space, the liquid can move to the gap with good efficiency and the pressure may be absorbed.

In addition, the air pressure in the internal space may be lower than the air pressure around the partition member. By configuring in this way, the encapsulated body is subjected to pressure exerted by the outer package body as a result of the difference in air pressure between the internal space and the periphery of the partition member, and because the encapsulated body is fixed, the liquid can move into the gap with good efficiency.

<Partition Member>

FIG. 1A is a frontal view that illustrates a first example of a configuration of a partition member according to an embodiment. FIG. 1B illustrates an end surface of the partition member illustrated in FIG. 1A, in a case where the partition member is cut along the line denoted by A-A. The external shape of the partition members 1 is, for example, a plate-like shape or sheet-like shape having a thickness.

In the examples illustrated in FIG. 1A and FIG. 1B, the partition member 1 is formed into a plate-like shape having a height, a width and a thickness, and has a thickness direction D and a planar direction P. The planar direction P is orthogonal to the thickness direction D. The planar direction P includes the height direction H and width direction W of the partition member 1 and an oblique direction, as long as these directions are orthogonal to the thickness direction D.

The partition member 1 is used to form a partition between single batteries that constitute an assembled battery or between a single battery that constitutes an assembled battery and a member other than the single battery in this thickness direction D.

[Liquid]

In the partition member 1, the liquid retained in the encapsulated body 110 that is to be accommodated in the internal space of the outer package body is a fluid that can exude from the encapsulated body 110, such as water, in cases where the encapsulated body 110 contracts as a result of expansion of a single battery. In addition, in cases where the single battery contracts and the encapsulated body 110 returns to its original state, the liquid that had exuded from the encapsulated body 110 can move to the inner part of the encapsulated body 110. The liquid should be one which exhibits thermal conductivity and which can move heat generated by a single battery to an adjacent single battery with good efficiency. In addition, the liquid is preferably a liquid having a boiling point of at least 80° C. and not more than 250° C. at normal pressure, and more preferably a liquid having a boiling point of at least 100° C. and not more than 150° C. at normal pressure.

In addition to water, the liquid preferably includes at least one type selected from the group consisting of, for example, water, alcohols, esters, ethers, ketones, hydrocarbons, fluorine-based compounds and silicone-based oils. It is possible to use one of these in isolation or a mixture of two or more types thereof.

Examples of alcohols which may be used in the liquid include alcohols having 3 to 8 carbon atoms, such as propanol, isopropanol, butanol, benzyl alcohol and phenylethyl alcohol; and dihydric or higher alcohols, such as alkylene glycols such as ethylene glycol and propylene glycol. It is possible to use one of these in isolation or a mixture of two or more types thereof.

Examples of esters able to be used in the liquid include alkyl esters of aliphatic carboxylic acids, alkyl carbonic acid diesters, alkyl oxalic acid diesters and fatty acid esters of ethylene glycol. Examples of alkyl esters of aliphatic carboxylic acids include lower alkyl esters of aliphatic carboxylic acids, such as lower alkyl formic acid esters such as methyl formate, n-butyl formate and isobutyl formate; lower alkyl acetic acid esters such as n-propyl acetate, isopropyl acetate, n-butyl acetate and isobutyl acetate; and lower alkyl propionic acid esters such as ethyl propionate, n-propyl propionate, isopropyl propionate, n-butyl propionate and isobutyl propionate. Examples of alkyl carbonic acid diesters include lower alkyl carbonic acid diesters such as dimethyl carbonate, diethyl carbonate, di-butyl carbonate and methyl ethyl carbonate. Examples of alkyl oxalic acid diesters include lower alkyl oxalic acid diesters such as dimethyl oxalate and diethyl oxalate. Examples of acetic acid esters of ethylene glycol include propyl acetate and butyl acetate. Examples of fatty acid esters of ethylene glycol include ethylene glycol acetic acid ester. It is possible to use one of these in isolation or a mixture of two or more types thereof.

Examples of ethers able to be used in the liquid include n-butyl ether, n-propyl ether and isoamyl ether. It is possible to use one of these in isolation or a mixture of two or more types thereof.

Examples of ketones able to be used in the liquid include ethyl methyl ketone and diethyl ketone. It is possible to use one of these in isolation or a mixture of two or more types thereof.

Examples of hydrocarbons able to be used in the liquid include heptane, octane, nonane, decane, toluene and xylene. It is possible to use one of these in isolation or a mixture of two or more types thereof.

Examples of fluorine-based compounds able to be used in the liquid include the refrigerants 1,1,2,2,3,3,4-heptafluorocyclopentane (HFC-c447ef) and 1,1,1,2,2,3,3,4,4,5,5,6,6-tridecafluorooctane (HFC-76-13sf). It is possible to use one of these in isolation or a mixture of two or more types thereof.

Examples of silicone-based oils able to be used in the liquid include methylpolysiloxane, methylphenylpolysiloxane, cyclic methylsiloxane and modified silicone oils such as silicone-polyether copolymers. It is possible to use one of these in isolation or a mixture of two or more types thereof.

In addition, the liquid may contain anti-freeze agents, preservatives and pH-adjusting agents. It is possible to use one of these in isolation or a mixture of two or more types thereof. The liquid may contain additives such as substances that impart anti-freeze properties (anti-freeze agents), preservatives and pH-adjusting agents. Substances contained in the liquid are not limited to this, and other substances may be added according to need.

[Encapsulated Body]

The encapsulated body 110 can retain the liquid mentioned above, and is generally elastic. In cases where the outer package body 120 contracts in the thickness direction D as a result of expansion of a single battery, the elastic encapsulated body 110 contracts and deforms in response to deformation of the outer package body 120. If the encapsulated body 110 contracts, the liquid retained in the encapsulated body 110 exudes from the encapsulated body 110 and moves to the gap formed in the internal space of the outer package body 120. In the example illustrated in FIG. 1A, the encapsulated body 110 is formed into a plate-like or sheet-like shape. The encapsulated body 110 is accommodated in the plate-like or sheet-like outer package body 120, and the edge part of the outer package body 120 is tightly sealed.

The encapsulated body 110 is formed of, for example, a material that includes a porous body. The porous body preferably contains a fibrous substance and/or particles. The porous body containing a fibrous substance is, for example, preferably at least one type selected from the group consisting of paper, cotton sheets, polyimide fibers, aramid fibers, polytetrafluoroethylene (PTFE) fibers, glass fibers, rock wool, ceramic fibers and biosoluble inorganic fibers. In addition, the porous body containing particles is, for example, preferably at least one type selected from the group consisting of silica particles, alumina particles, calcium silicate, clay minerals, vermiculite, mica, cement, pearlite, fumed silica and aerogel. Among types of calcium silicate, xonotlite, tobermorite, wollastonite and gyrolite are preferred, and gyrolite is particularly preferred. Principal clay minerals are magnesium silicate, montmorillonite and kaolinite.

In addition, the entire encapsulated body 110 may be formed of a porous body. The explanation given below is for a case in which the encapsulated body 110 is formed of a porous body.

The liquid is retained in cavities in the porous body that forms the encapsulated body 110. For example, by injecting the liquid into the encapsulated body 110 or immersing the encapsulated body 110 in the liquid, the encapsulated body 110 can retain the liquid through impregnation.

[Outer Package Body]

The outer package body 120 has a tightly-sealable edge part 120a, and accommodates the encapsulated body 110 that retains the liquid in the internal space, which is formed through tight sealing. The outer package body 120 is flexible and can deform in response to expansion of a single battery. In addition, the outer package body 120 can return to its original state when the single battery contracts. For example, a resin sheet, a resin film, or the like, may be used as the outer package body 120. For example, by inserting the encapsulated body 110 in two resin sheets or resin films or a resin sheet or resin film folded in two and then heat sealing or bonding the edge part of the outer package body 120 in contact with the two resin sheets or resin films, it is possible to seal the encapsulated body 110 in which the liquid is impregnated.

At least a part of the edge part of the outer package body 120 is provided with fixing parts 120c for fixing the encapsulated body 110 in order to prevent the position of the encapsulated body 110 from shifting in the internal space of the outer package body 120. For example, in cases where the internal space of the outer package body 120 has little air and the internal air pressure is lower than the external air pressure, the outer package body 120 can prevent movement of the encapsulated body 110 by sandwiching the encapsulated body 110.

In the example illustrated in FIG. 1A, fixing parts 120c are provided at positions that overlap with the four corners of the encapsulated body 110 encapsulated therein. The fixing parts 120c are heat sealed or bonded in a state whereby the encapsulated body 110 is sandwiched. The positions where the fixing parts 120c are provided are not limited to those illustrated in the example in FIG. 1A, and may be provided at two corners on a diagonal line between the four corners of the encapsulated body 110 or at the central parts of the sides of the encapsulated body 110.

A material made of a resin or metal may be used as the outer package body 120. A laminated product obtained by layering a metal foil and a resin is preferred from the perspectives of high heat resistance and strength. A laminated body having at least three layers, including a resin layer, a metal layer and a resin sealant layer, is preferred as the laminated body of a metal foil and a resin.

Examples of the metal include an aluminum foil, a copper foil, a tin foil, a nickel foil, a stainless steel foil, a lead foil, a tin-lead alloy foil, a bronze foil, an iridium foil and a phosphor bronze foil. In particular, an aluminum foil, a copper foil or a nickel foil is preferred, and an aluminum foil is more preferred.

A thermosetting resin and/or a thermoplastic resin may be used as the resin, but a thermoplastic resin is particularly preferred. Examples of resins include polyethylene, polypropylene, polystyrene, nylon resins, acrylic resins, epoxy resins, polyurethanes, polyether ether ketones, polyethylene terephthalate, polyphenylene sulfide, polycarbonates and aramid resins. In particular, the resin is preferably at least one type selected from among polypropylene, nylon resins and polyethylene terephthalate.

The thickness of the outer package body 120 is not particularly limited, but is, for example, 5 to 200 µm. In the case of the layered product mentioned above, the thickness of the metal foil may be 3 to 50 µm and the thickness of the resin layer may be 2 to 150 µm. Due to this configuration, it is possible to ensure that the heat resistance and low water vapor permeability of the metal foil are achieved and possible to improve sealing properties by means of the resin.

In addition, the outer package body 120 is such that the liquid and the encapsulated body 110 are sealed inside the outer package body 120 by joining edge parts of two outer package bodies in a ring-like shape by means of heat sealing, bonding, or the like. Alternatively, the liquid and the encapsulated body 110 may be sealed by folding one outer package body and bonding the edge part thereof by means of heat sealing, bonding, or the like. The outer package body 120 is preferably flexible (elastic), but may, in some cases, not be flexible.

[Internal Space in Outer Package Body]

In the internal space formed by tightly sealing the outer package body 120, the gap 120b is formed between the encapsulated body and the sealed part of the edge part. A plurality of gaps 120b or a single gap 120b may be formed in the internal space of the outer package body 120. In cases where the external air pressure is higher than the internal air pressure in outer package bodies 120 that form gaps 120b, the outer package bodies 120 may be in a state that is unbonded but overlapping. However, the outer package bodies 120 may be separated from each other due to the rigidity of the outer package bodies 120 or by a gas inside the internal space. The internal air pressure in the outer package body 120 is preferably lower than the external air pressure.

A gap 120b should function as an evacuation location for the liquid that has exuded from the encapsulated body that has been formed as a result of pressure caused by expansion of the single battery. In cases where a single battery in an assembled battery expands and compresses an adjacent partition member 1 during charging or the like, liquid that has exuded from the encapsulated body 110 as a result of pressure from the single battery moves to a gap 120b where the encapsulated body 110 is not present. Therefore, in cases where pressure is exerted by a single battery adjacent to a partition member 1, because the liquid retained in the encapsulated body moves into the gap 120b, pressure from the liquid exerted on the outer package body 120 is reduced. Therefore, it is possible to avoid release of the sealed state caused by rupture or the like of the outer package body 120. By providing the gaps 120b in the internal space of the outer package body 120, the partition member 1 absorbs pressure caused by expansion of a single battery in the assembled battery and the pressure resistance of the partition member 1 is improved.

If the internal space in the outer package body 120 is seen in a planar view from the thickness direction D of the partition member 1, the area S1 of the encapsulated body 110 and the area S2 of the gaps 120b satisfy the relationship represented by formula 1 above, and the volume V1 of the liquid and the volume V2 of the encapsulated body 110 satisfy the relationship represented by formula 2 above. The area (S1+S2) is the area of the internal space when the partition member 1 is seen in a planar view from the thickness direction D. However, in cases where a fixing part 120c is formed in a part of the edge part of the outer package body 120, the area of the internal space is taken to not include the area of the fixing part 120c when the partition member 1 is seen in a planar view from the thickness direction D.

If the internal space in the outer package body 120 is seen in a planar view from the thickness direction D of the partition member 1, the area S1 of the encapsulated body 110 is hereinafter also referred to as the area S1 of a region where the encapsulated body 110 is present. The area S1 of a region where the encapsulated body 110 is present is the area of the part in FIG. 1A that indicates the encapsulated body 110. In addition, if the internal space in the outer package body 120 is seen in a planar view from the thickness direction D of partition member 1, the area S2 of the gaps 120b is hereinafter also referred to as the area S2 of a region where the encapsulated body 110 is not present. The area S1 of a region where the encapsulated body 110 is not present is the area of the parts in FIG. 1A that indicate the gaps 120b. If the internal space in the outer package body 120 is seen in a planar view from the thickness direction D of the partition member 1, the area (S1+S2) of the internal space is also referred to simply as the area (S1+S2) of the regions of the internal space.

Figure 2:
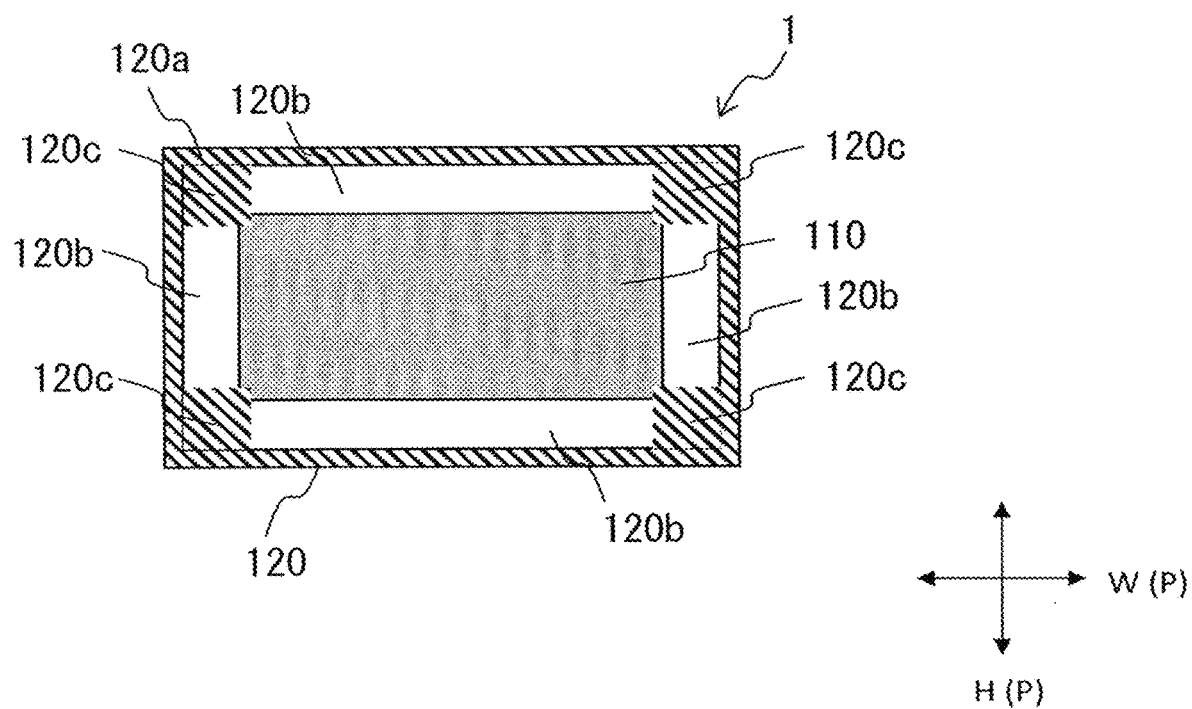
FIG. 2 is a front view that illustrates a second example of a configuration of a partition member according to an embodiment.

It is allowed as long as the area S1 of a region where the encapsulated body 110 is present is smaller than the area (S1+S2) of the regions of the internal space. Therefore, the area S1 of a region where the encapsulated body 110 is present may be smaller than that illustrated in the example illustrated in FIG. 1A, as illustrated in FIG. 3. In the example illustrated in FIG. 2, because the gaps 120b are larger than those in the example illustrated in FIG. 1A, in cases where the thickness of the partition member 1 is the same, the partition member 1 illustrated in FIG. 2 can exude a greater amount of liquid into the gaps 120b, meaning that the pressure resistance of the partition member 1 is improved.

The value of S1/(S1+S2) satisfies the relationship represented by formula 1 above, but from the perspective of pressure resistance, the range allowed for this value is preferably at least 0.10, more preferably at least 0.20, further preferably at least 0.40, and particularly preferably at least 0.60. In addition, from the perspective of pressure resistance, the value of S1/(S1+S2) is preferably not more than 0.95, and more preferably not more than 0.90. By increasing the area S1 of a region where the encapsulated body 110 is present, good thermal conductivity of the partition member 1 may be achieved.

In order to satisfy the relationship represented by formula 1 above and achieve good heat resistance and heat conduction characteristics, the volume V1 of the liquid and the volume V2 of the encapsulated body 110 satisfy the relationship represented by formula 2 above. From the perspective of heat conduction characteristics, the value of V1/V2 is preferably at least 0.05, and more preferably at least 0.10. In addition, from the perspectives of pressure resistance and heat conduction characteristics, the value of V1/V2 is preferably not more than 1.70, more preferably not more than 1.40, further preferably not more than 1.10, and particularly preferably not more than 0.80. The volume V2 of the encapsulated body 110 may be calculated as the volume of the space surrounded by those surfaces that form the outer peripheral surface of the encapsulated body 110. For example, in cases where the encapsulated body 110 is an approximately cuboid shape, the volume V2 should be calculated by measuring the length, the width and the height. In cases where it is difficult to calculate the volume V2 by measuring the sizes of the outer peripheral surfaces of the encapsulated body 110, the volume obtained by pouring a resin into cavities present in the porous body that forms the encapsulated body 110 may be determined as the volume V2.

<Assembled Battery>

An explanation will now be given of an assembled battery in which the partition member 1 is used. Assembled batteries are used in battery packs fitted to, for example, electric vehicles (EV), hybrid electric vehicles (HEV), plug-in hybrid electric vehicles (PHEV), heavy electrical equipment, electric bikes, power-assisted bicycles, ships, aircraft, electric trains, uninterruptible power supplies (UPS), domestic power storage systems, storage battery systems for power system stabilization systems that use renewable energy such as wind power, solar power, tidal power or geothermal energy, and the like. However, assembled batteries may also be used as power sources for supplying electrical power to equipment other than the EVs and the like mentioned above.

[Single Battery]

Figure 3A:
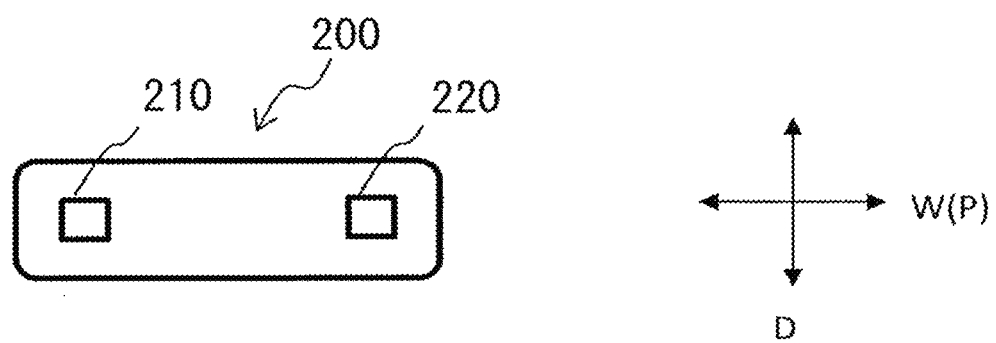
FIG. 3A is a planar view that illustrates an example of a single battery that constitutes an assembled battery.
Figure 3B:
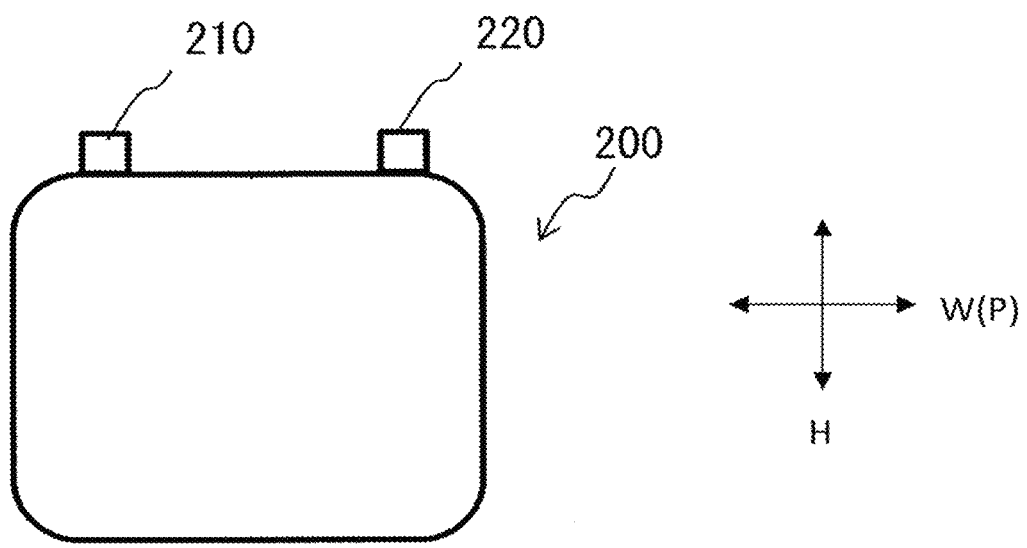
FIG. 3B is a front view that illustrates an example of a single battery that constitutes an assembled battery.
Figure 3C:
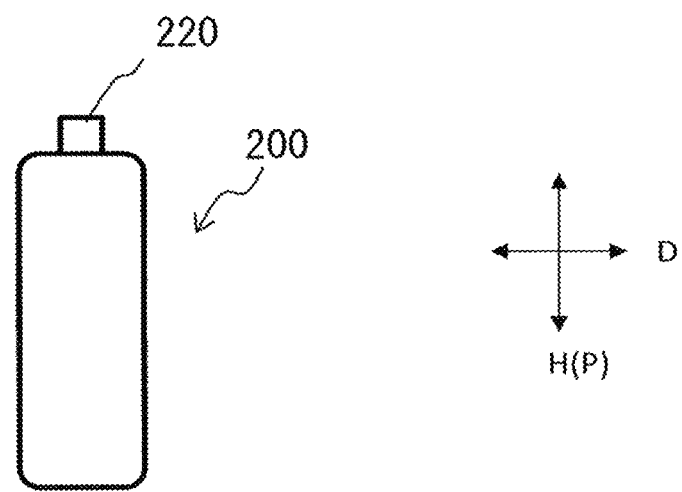
FIG. 3C is a side view that illustrates an example of a single battery that constitutes an assembled battery.

FIG. 3A is a planar view that illustrates an example of a single battery that constitutes an assembled battery, FIG. 3B is a frontal view that illustrates an example of a single battery, and FIG. 3C is a side view that illustrates an example of a single battery.

A single battery 200 has a cuboid shape having a length (thickness), a breadth (width) and a height, and a terminal 210 and a terminal 220 are provided on the upper surface of the single battery. The single battery 200 is, for example, a lithium ion secondary battery provided with a positive electrode and negative electrode, which are capable of storing and releasing lithium ions, and an electrolyte. In addition to lithium ion secondary batteries, it is possible to use a secondary battery such as a lithium ion all solid state battery, a nickel-metal hydride battery, a nickel-cadmium battery or a lead storage battery.

[Assembled Battery]

Figure 4:
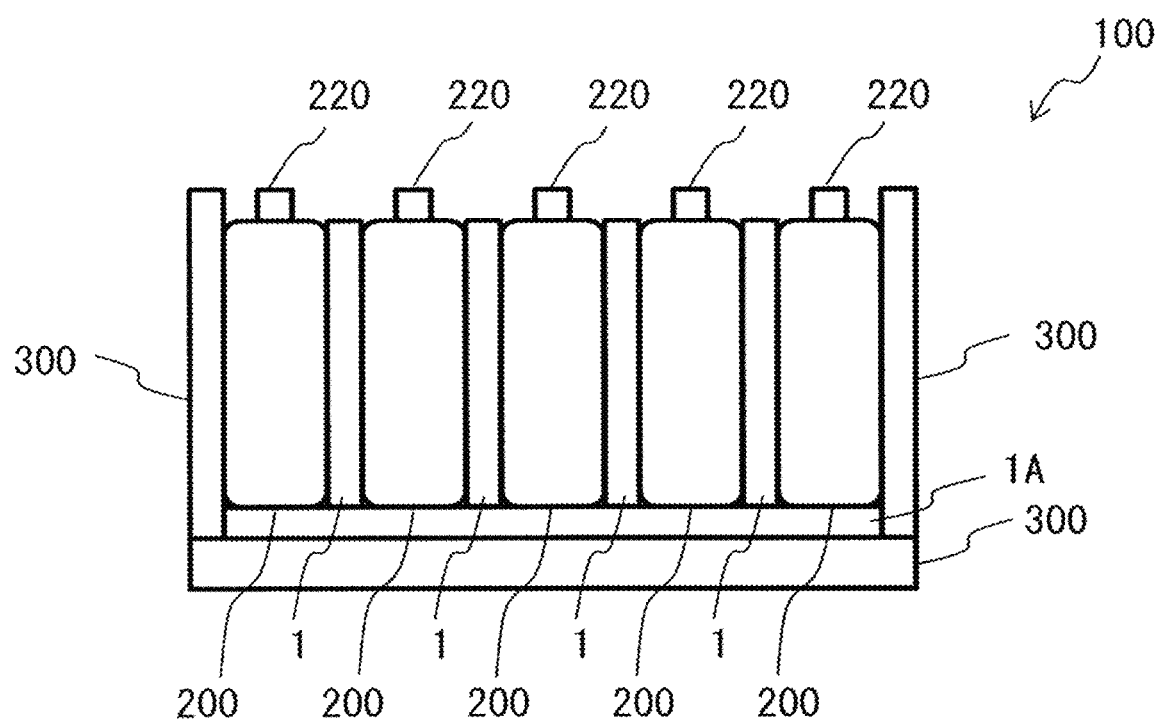
FIG. 4 is a drawing that illustrates an end surface of an assembled battery formed using a plurality of single batteries, in a case where the assembled battery is cut along a face that passes through terminals of single batteries in a height direction H.

FIG. 4 is a drawing that illustrates an end surface of an assembled battery formed using a plurality of single batteries, in a case where the assembled battery is cut along a face that passes through terminals of single batteries in a height direction H. In an assembled battery 100, a plurality of single batteries 200 are accommodated in a housing 300 having a bottom surface and four side surfaces. A partition member 1, which is described above, is disposed between single batteries 200 and forms partitions between the adjacent single batteries 200 in the thickness direction D of the partition member 1. The assembled battery 100 outputs electrical power as a result of positive electrode terminals (for example, terminals 210) and negative electrode terminals (for example, terminals 220) of single batteries 200, which are adjacent to each other, being electrically connected in series by means of bus bars (not illustrated). As illustrated in FIG. 4, the assembled battery 100 may be such that a partition member 1A, which has a similar configuration to the partition member 1, is disposed between the bottom surface of the housing 300 and the single batteries 200.

Specific aspects of the present invention will now be explained in greater detail through the use of Examples, but the present invention is in no way limited to these examples.

Example 1

As the outer package body 120, two sheets of a laminated aluminum film (including polyethylene terephthalate (outside) and polyethylene (inside) as resin layers and having a thickness of 0.15 cm) were cut into rectangular shapes having a length of 12 cm and a width of 18 cm, and then heat sealed (for 3 seconds at a temperature of 150° C.) on three sides at a width of 1 cm. A porous sheet (a vermiculite sheet having a thickness of 0.2 cm) cut into a rectangular shape having a length of 8 cm and a width of 14 cm was accommodated as the encapsulated body 110 via the portion of the outer package body 120 that had not been heat sealed, 9 g (cm$^3$) on water was injected as a liquid, the portion that had not been heat sealed was heat sealed at a width of 1 cm, and excess periphery was cut off, thereby producing the partition member 1, which had a length of 11 cm, a width of 17 cm and a thickness of 2.1 mm. In this partition member 1, the area of the regions of the internal space in the outer package body 120 was 135 cm$^2$, the area S1 of a region where the encapsulated body was present was 112 cm$^2$, and the area S2 of a region where the encapsulated body was not present was 23 cm$^2$. In the examples and comparative examples, the areas of these regions are areas where the partition member 1 is seen in a planar view from the thickness direction D. In addition, length means the length in the height direction H, and width means the length in the width direction W.

A metal plate (length 15 cm, with 10 cm, thickness 1 cm, SUS 430, available from Misumi Group Inc.) was placed on the partition member 1, a load was applied using a high pressure jack (J-15, available from AS ONE Corporation), and the rupture pressure of the partition member 1 was calculated by dividing the load when the partition member 1 ruptured by the area of the regions of the internal space in the partition member 1. In cases where fixing parts 120c were formed in the internal space, the rupture pressure was calculated after subtracting the area of the fixing parts 120c when the partition member 1 was seen in a planar view from the thickness direction D from the area of the regions of the internal space.

Next, a heater, a brass plate, the partition member 1, a brass plate and a metal plate (SUS, 3.9 kg) were bonded in that order. In this state, the heater was heated to a temperature of 80° C., and once the temperature of the heater reached 80° C., heating was continued for 30 minutes. Following completion of the heating, the temperature of the brass plate on the metal plate side was 73.1° C., and the heat conduction characteristics of the partition member of Example 1 were good.

Examples 2 to 6

Partition members 2 to 6 were produced using similar procedures to those used in Example 1, except that the size (length, width and thickness) of the encapsulated body 110, the amount of liquid (the volume of liquid retained in the encapsulated body 110) and the size (length and width) of regions in the internal space in the outer package body 120 were altered to the values listed in Table 1.

The rupture pressure and heat conduction characteristics of partition members 2 to 6 were measured using a similar method to that used for partition member 1.

Comparative Examples 1 to 4

Partition members 11 to 14 were produced using similar procedures to those used in Example 1, except that the size (length, width and thickness) of the encapsulated body 110, the amount of liquid (the volume of liquid retained in the encapsulated body 110) and the size (length and width) of regions in the internal space in the outer package body 120 were altered to the values listed in Table 1.

lated for the examples and comparative examples. For results relating to heat conduction characteristics, "0" indicates good heat conduction characteristics, and "X" indicates poor heat conduction characteristics. Heat conduction characteristics were assessed as being good in cases where the temperature of the brass plate on the metal plate side was at least 70° C. following completion of the heating by the heater.

[Table 1]

TABLE 1

|  | PARTITION MEMBER | SIZE OF ENCAPSULATED BODY | | | | | AMOUNT OF LIQUID ($cm^3$) | *1 | |
|---|---|---|---|---|---|---|---|---|---|
|  |  | LENGTH (cm) | WIDTH (cm) | THICKNESS (mm) | VOLUME V2 ($cm^3$) | AREA S1 ($cm^2$) |  | LENGTH (cm) | WIDTH (cm) |
| EXAMPLE 1 | 1 | 8 | 14 | 2 | 22 | 112 | 9 | 9 | 15 |
| EXAMPLE 2 | 2 | 7 | 13 | 2 | 18 | 91 | 9 | 9 | 15 |
| EXAMPLE 3 | 3 | 6 | 12 | 2 | 14 | 72 | 9 | 9 | 15 |
| EXAMPLE 4 | 4 | 8 | 14 | 1 | 11 | 112 | 7 | 9 | 15 |
| EXAMPLE 5 | 5 | 8 | 14 | 3 | 34 | 112 | 9 | 9 | 15 |
| EXAMPLE 6 | 6 | 8.4 | 14.4 | 3 | 36 | 121 | 9 | 9.2 | 15.2 |
| COMPARATIVE EXAMPLE 1 | 11 | 13 | 10.4 | 2 | 27 | 135 | 10.8 | 13 | 10.4 |
| COMPARATIVE EXAMPLE 2 | 12 | 13 | 10.4 | 1 | 14 | 135 | 8.5 | 13 | 10.4 |
| COMPARATIVE EXAMPLE 3 | 13 | 8 | 14 | 2 | 22 | 112 | 0.2 | 9 | 15 |
| COMPARATIVE EXAMPLE 4 | 14 | 8 | 14 | 2 | 22 | 112 | 45 | 9 | 15 |

|  | *1 AREA ($cm^2$) | *2 AREA S2 ($cm^2$) | V1/V2 | S1/(S1+S2) | RAPTURE PRESSURE (MPa) | *3 (° C.) (HEAT CONDUCTION CHARACTERISTICS) |
|---|---|---|---|---|---|---|
| EXAMPLE 1 | 135 | 23 | 0.40 | 0.83 | 5.8 | 73.1 o |
| EXAMPLE 2 | 135 | 44 | 0.49 | 0.67 | 7.3 | 73.0 o |
| EXAMPLE 3 | 135 | 63 | 0.63 | 0.53 | 10.9 | 72.6 o |
| EXAMPLE 4 | 135 | 23 | 0.63 | 0.83 | 3.6 | 74.1 o |
| EXAMPLE 5 | 135 | 23 | 0.27 | 0.83 | 10.2 | 72.6 o |
| EXAMPLE 6 | 140 | 19 | 0.25 | 0.86 | >10.5 | 70.8 o |
| COMPARATIVE EXAMPLE 1 | 135 | 0 | 0.40 | 1.00 | 2.2 | 67.2 x |
| COMPARATIVE EXAMPLE 2 | 135 | 0 | 0.63 | 1.00 | 1.5 | 71.1 o |
| COMPARATIVE EXAMPLE 3 | 135 | 23 | 0.01 | 0.83 | >10.9 | 65.2 x |
| COMPARATIVE EXAMPLE 4 | 135 | 23 | 2.01 | 0.83 | 0.4 | 68.5 x |

Figure 5:
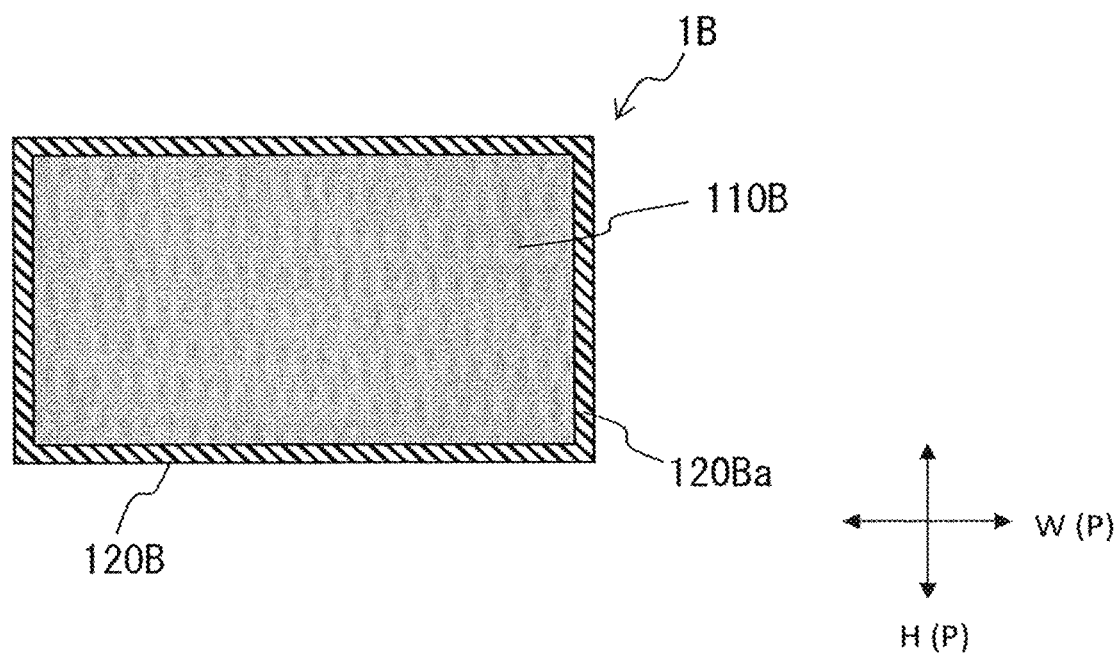
FIG. 5 is a front view that illustrates an example of a configuration of a partition member according to a comparative example.

*1: Size of regions in internal space in outer package body
*2: Area S2 of region where encapsulated body is not present
*3: Temperature of upper part of partition member As illustrated by partition member 1B in FIG. 5, partition members 11 and 12 produced in Comparative Examples 1 and 2 are comparative examples in which the size of an encapsulated body 110B is approximately the same as the size of regions other than the edge part 120Ba in the partition member 1B and there is no region where the encapsulated body 110B is not present.

The rupture pressure and heat conduction characteristics of partition members 11 to 14 were measured using a similar method to that used for partition member 1.

Table 1 lists the size (length, width and thickness) of the encapsulated body 110, the amount of liquid and the size (length and width) of regions in the internal space in the outer package body 120 in the examples and comparative examples. In addition, Table 1 shows results relating to rupture pressure and heat conduction characteristics calcu- As listed in Table 1, in cases where the area S1 and the area S2 satisfy the relationship represented by formula 1 (S1/(S1+S2)≤0.99) and the volume V1 and the volume V2 satisfy the relationship represented by formula 2 (0.02≤V1/V2≤1.90), it is possible to obtain a partition member that exhibits good pressure resistance. In addition, partition members according to examples that satisfy the relationships represented by formula 1 and formula 2 exhibited good thermal conductivity.

The partition member of Comparative Example 1 (designated partition member #11) is a partition member in which the sizes of regions other than fixing parts are the same as in the partition member of Example 1 (designated partition member #1) and in which no gaps 120b are present. The rupture pressure of partition member #11 was lower than the rupture pressure of partition member #1 (5.8 MPa)

and was less than 3 MPa. That is, it has been found that good pressure resistance may not be achieved in cases where no gaps 120b are present.

The partition member of Comparative Example 2 (designated partition member #12), like that of Comparative Example 1, is a partition member in which the sizes of regions other than fixing parts are the same as in partition member #1 of Example 1 and in which no gaps 120b are present. Furthermore, partition member #11 was thinner than partition member #1. The rupture pressure of partition member #12 was lower than the rupture pressure of partition member #1 (5.8 MPa) and was less than 3 MPa. That is, it has been found that good pressure resistance may not be achieved in cases where no gaps 120b are present.

The partition member of Comparative Example 3 (designated partition member #13) is a partition member in which the amount of encapsulated water (liquid amount V1) is significantly less than in partition member #1 of Example 1. The rupture pressure of partition member #13 was higher than the rupture pressure of partition member #1 (5.8 MPa) and was greater than 10.9 MPa. However, good heat conduction characteristics could not be achieved.

The partition member of Comparative Example 4 (designated partition member #14) is a partition member in which the amount of encapsulated water (liquid amount V1) is significantly more than in partition member #1 of Example 1. The rupture pressure of partition member #14 was lower than the rupture pressure of partition member #1 (5.8 MPa) and was less than 3 MPa. That is, it has been found that good pressure resistance may not be achieved in cases where the value of V1/V2 is greater than the range represented by formula 2.

The partition member of Example 2 (designated partition member #2) is a partition member in which the size of the encapsulated body 110 is smaller than in partition member #1 of Example 1. In addition, the partition member of Example 3 (designated partition member #3) is a partition member in which the size of the encapsulated body 110 is even smaller than in partition member #2 of Example 2. The rupture pressures of partition member #2 and partition member #3 were higher than the rupture pressure of partition member #1 (5.8 MPa) and were 7.3 MPa and 10.9 MPa, respectively. That is, it has been found that in the case of a partition member that corresponds to the present invention, as the size of the encapsulated body 110 decreases, the amount of encapsulated water able to exude from the encapsulated body 110 into the gaps 120b increases and pressure resistance improves.

The partition member of Example 4 (designated partition member #4) is a partition member in which the encapsulated body 110 is thinner and the amount of encapsulated water (liquid amount V1) is less in comparison with partition member #1 of Example 1. The rupture pressure of partition member #4 was lower than the rupture pressure of partition member #1 (5.8 MPa) and was 3.6 MPa. Meanwhile, the partition member of Example 5 (designated partition member #5) is a partition member in which the encapsulated body 110 is thicker than in partition member #1 of Example 1. The rupture pressure of partition member #5 was higher than the rupture pressure of partition member #1 (5.8 MPa) and was 10.2 MPa. That is, it has been found that in the case of a partition member that corresponds to the present invention, as the encapsulated body 110 becomes thicker, pressure resistance improves.

The partition member of Example 6 (designated partition member #6) is a partition member in which the sizes of the encapsulated body 110 and the outer package body 120 are larger than in partition member #5 of Example 5. The rupture pressure of partition member #6 was higher than the rupture pressure of partition member #5 (10.2 MPa) and was greater than 10.5 MPa. That is, it has been found that in the case of a partition member that corresponds to the present invention, if the sizes of the encapsulated body 110 and the outer package body 120 increase, the amount of encapsulated water decreases, and pressure resistance improves as the amount of encapsulated water decreases.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A partition member which has a thickness direction and a planar direction orthogonal to the thickness direction and which constitutes a partition between single batteries that constitute an assembled battery in the thickness direction or between a single battery that constitutes an assembled battery and a member other than the single battery, the partition member comprising:
    an encapsulated body capable of retaining a liquid; and
    an outer package body for accommodating the encapsulated body and the liquid, wherein
    the area S1 of the encapsulated body when the outer package body and the encapsulated body are seen in a planar view from the thickness direction and the area S2 of a gap between the outer package body and the encapsulated body satisfy the relationship represented by formula 1 below,
    wherein the volume V1 of the liquid and the volume V2 of the encapsulated body satisfy the relationship represented by formula 2 below, $$S1/(S1+S2) \leq 0.99 \quad \text{Formula 1:}$$

$$0.02 \leq V1/V2 \leq 1.90 \quad \text{Formula 2:,}$$

wherein the liquid retained in the encapsulated body moves to the gap between the outer package body and the encapsulated body as a result of deformation of the outer package body and the encapsulated body when the external pressure increases, and
    wherein the gap is located between each side surface of the encapsulated body and the outer package body.

2. The partition member according to claim 1, wherein S1 and S2 above satisfy the relationship represented by formula 3 below $$0.10 \leq S1/(S1+S2) \leq 0.99 \quad \text{Formula 3:}$$

3. The partition member according to claim 1, wherein the liquid that has moved to the gap between the outer package body and the encapsulated body moves to the inner part of the encapsulated body as a result of deformation of the outer package body and the encapsulated body when the external pressure decreases.

4. The partition member according to claim 1, wherein the encapsulated body is fixed in an internal space in the outer package body.

5. The partition member according to claim 1, wherein the air pressure in the internal space in the outer package body is lower than the air pressure outside the outer package body.

6. The partition member according to claim 1, wherein the encapsulated body is formed of a material that includes a porous body.

7. The partition member according to claim 6, wherein the porous body contains a fibrous substance and/or particles.

8. The partition member according to claim 1, wherein the outer package body is a laminated body of a metal foil and a resin.

9. The partition member according to claim 8, wherein the metal foil is at least one type selected from an aluminum foil, a copper foil, a tin foil, a nickel foil, a stainless steel foil, a lead foil, a tin-lead alloy foil, a bronze foil, a silver foil, an iridium foil and phosphor bronze.

10. The partition member according to claim 8, wherein the resin is a thermoplastic resin.

11. An assembled battery that is provided with the partition member according to claim 1.

12. The partition member according to claim 1, wherein when positioned between single batteries, the partition member is sized so as to not protrude above adjacent batteries in a height direction.

13. The partition member according to claim 1, wherein the gap of the partition member is located between the single batteries.

* * * * *